Figure 1:
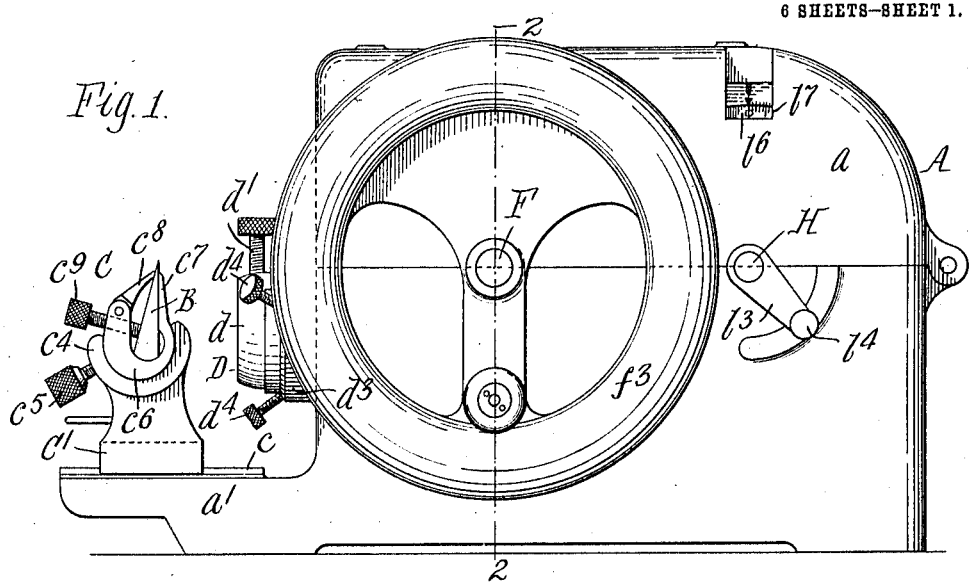

H. N. OTT.
MICROTOME.
APPLICATION FILED SEPT. 19, 1910.

1,026,280.

Patented May 14, 1912.
6 SHEETS—SHEET 1.

Witnesses.
A. G. Dimond.
C. A. Bund.

Inventor.
Harvey N. Ott
by Wilhelm, Parkert Hurd
Attorneys.

H. N. OTT.
MICROTOME.
APPLICATION FILED SEPT. 19, 1910.

1,026,280.

Patented May 14, 1912.
6 SHEETS—SHEET 2.

Witnesses.
A.G. Dimond
C.H. Bund

Inventor.
Harvey N. Ott
By Wilhelm, Parker & Reed
Attorneys.

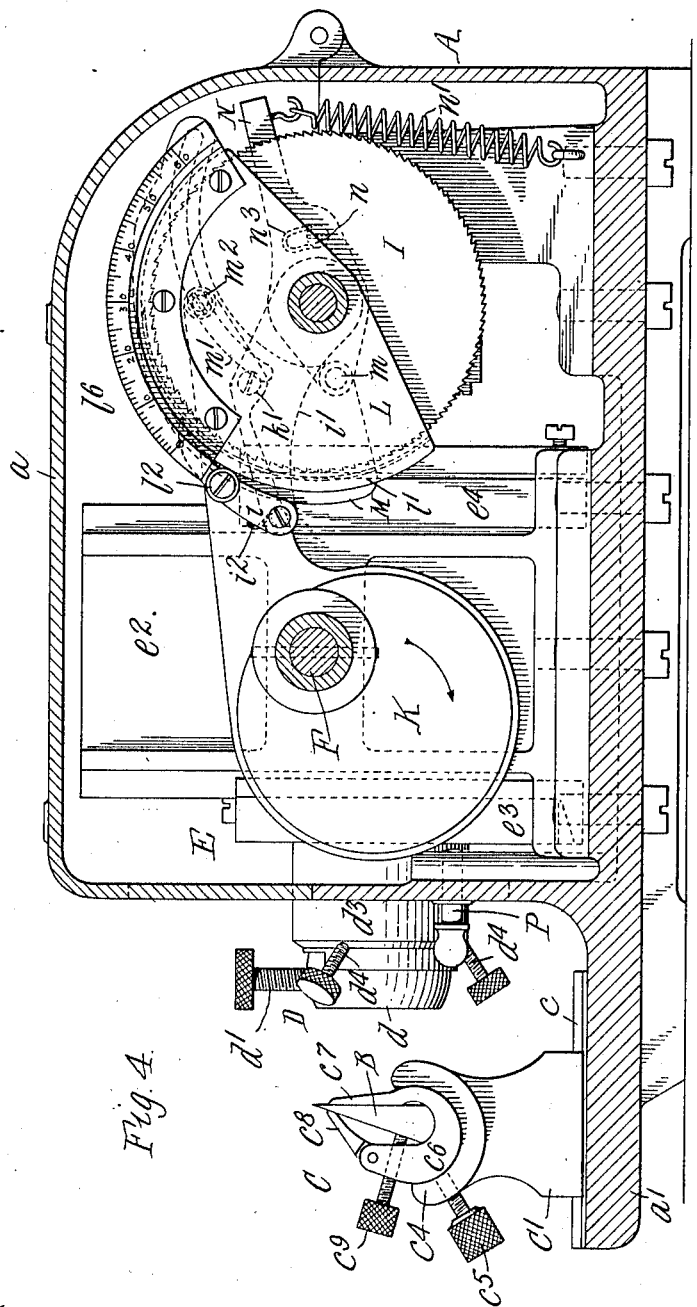

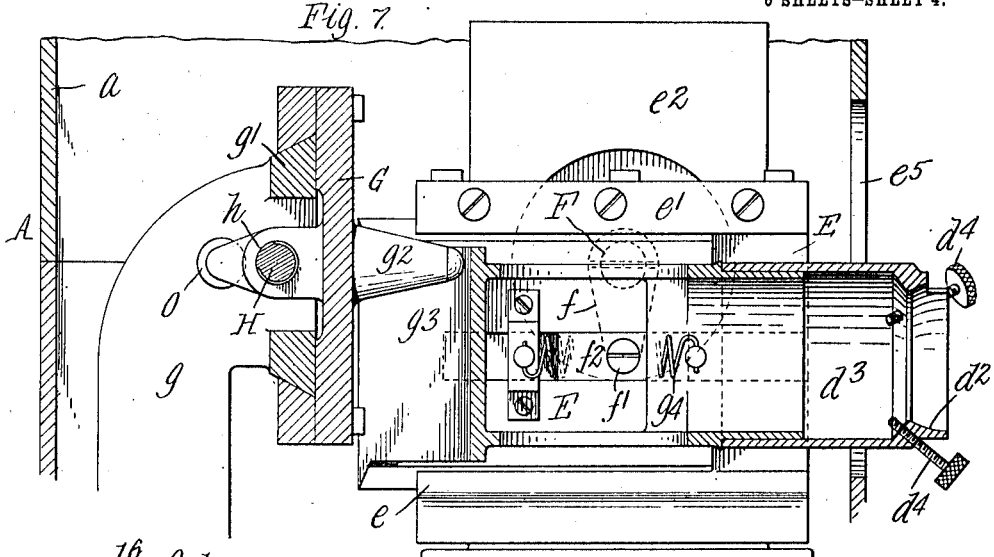
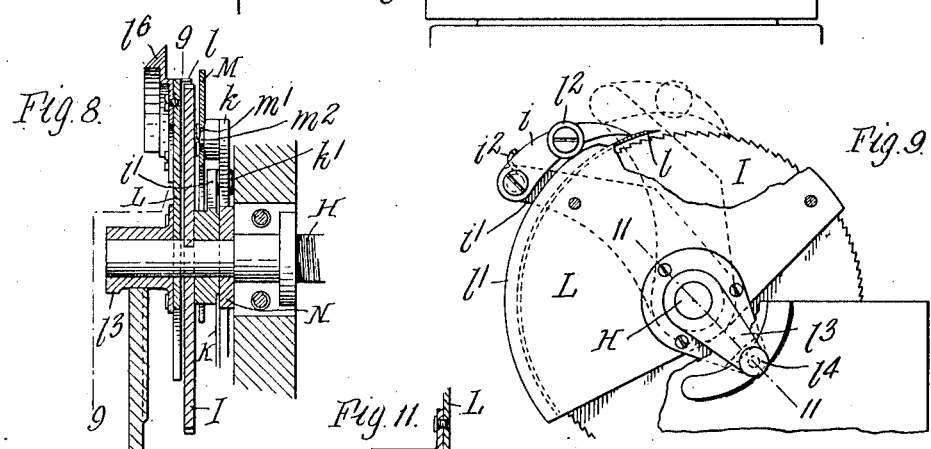
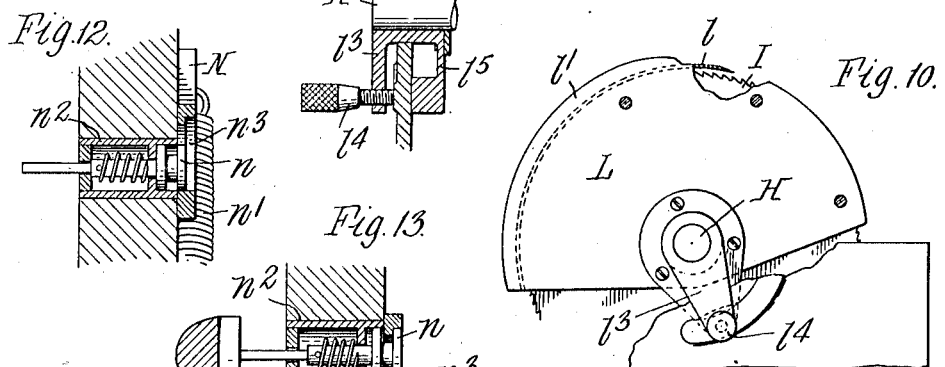

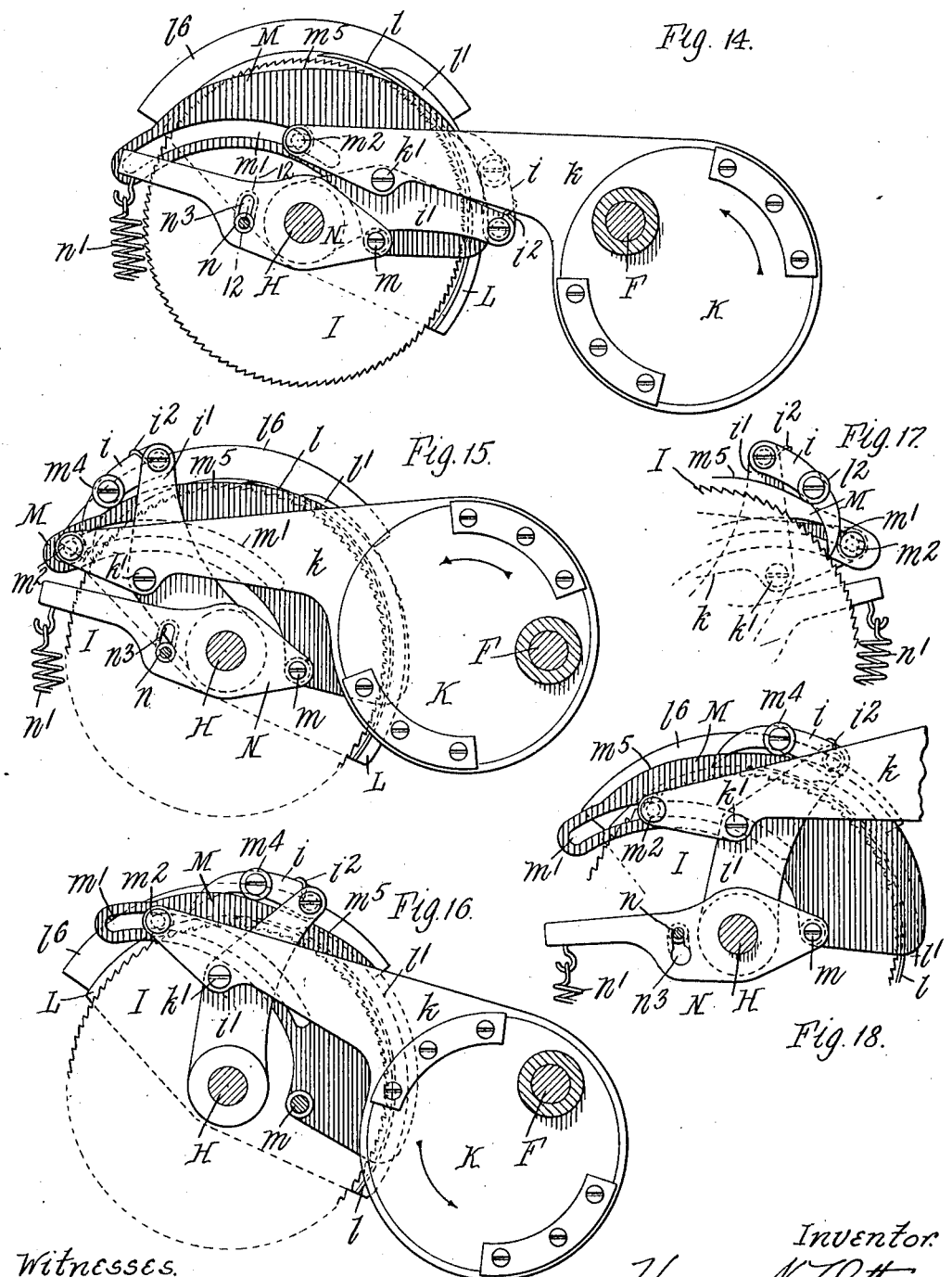

H. N. OTT.
MICROTOME.
APPLICATION FILED SEPT. 19, 1910.
1,026,280.
Patented May 14, 1912.
6 SHEETS—SHEET 6.
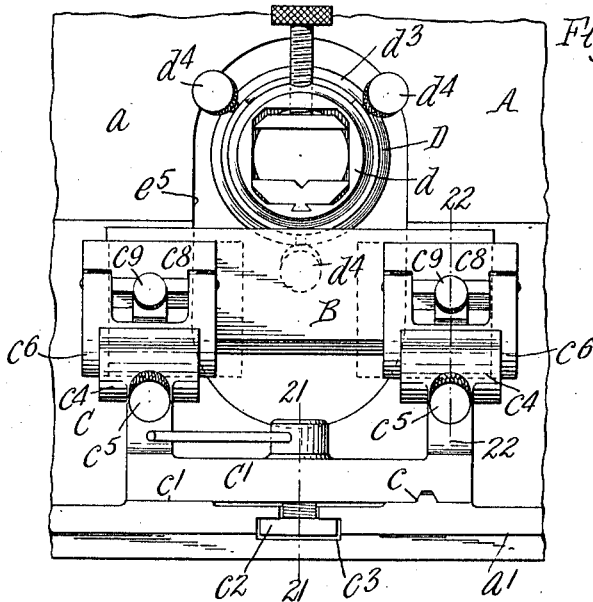
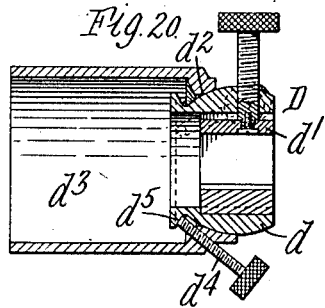
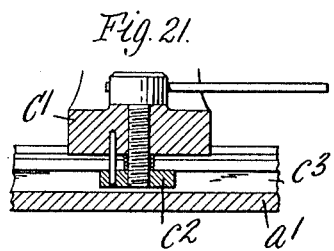
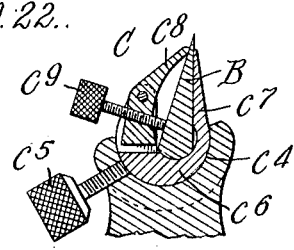
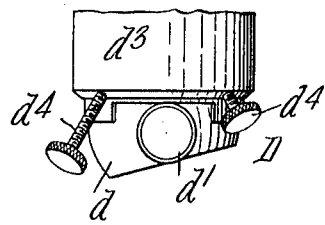

UNITED STATES PATENT OFFICE.

HARVEY N. OTT, OF BUFFALO, NEW YORK, ASSIGNOR TO SPENCER LENS COMPANY, OF BUFFALO, NEW YORK.

MICROTOME.

1,026,280.　　　　Specification of Letters Patent.　　Patented May 14, 1912.

Application filed September 19, 1910.　Serial No. 582,713.

*To all whom it may concern:*

Be it known that I, HARVEY N. OTT, a citizen of the United States, residing at Buffalo, in the county of Erie and State of New York, have invented a new and useful Improvement in Microtomes, of which the following is a specification.

This invention relates more particularly to improvements in microtomes of that type having a knife and a specimen holder, one of which parts reciprocates past the other to slice the specimen and one of which is advanced toward the other after each cut for cutting successive sections. These machines are intended for cutting microscopic sections and in order to cut sections of a prescribed thickness and which will be of uniform thickness throughout, it is essential to prevent any play or movement of the reciprocating part relative to the cutting plane.

One of the primary objects of the invention is to produce an efficient, strong and practical microtome in which the reciprocating part is fed or advanced for cutting successive sections by mechanism which affords a stable backing or support for the reciprocating part and positively prevents any play or motion thereof relative to the cutting plane irrespective of whether the supporting carriage for the reciprocating part has any play on its guides or bearings.

Other objects of the invention are to provide a ratchet and pawl feed mechanism for microtomes which advances the part fed thereby when the specimen is above and out of contact with the knife, which can be readily adjusted for cutting sections of different thicknesses and in which the pawl is prevented from dragging over the ratchet teeth in its return movement, thereby preventing any rearward movement of the ratchet wheel and making the feed mechanism positive, reliable and practically noiseless in action and reducing the wear in the same; also to provide a safety device which renders the feed mechanism inoperative and prevents injury thereto if the drive shaft is operated after the part actuated by the feed mechanism has reached the limit of its movement; also to inclose the working parts of the machine by a casing having a cover which can be opened to expose the covered parts; also to provide a specimen holder of simple and stong construction which can be readily set to hold the specimen in different required positions; also to provide a knife holder which holds the knife firmly and rigidly and enables the same to be quickly and easily secured in place, adjusted and removed; and also to improve microtomes in the other respects hereinafter described and set forth in the claims.

Briefly stated, a microtome embodying the invention comprises a holder for the specimen or object, a knife for cutting sections therefrom, a carriage on which the specimen holder is mounted and which is reciprocated by a crank shaft or other suitable operating means, and mechanism by which the specimen holder is fed forward intermittently so as to advance the specimen after each cut for cutting the next section. The specimen holder is carried by a slide which is movable toward and from the knife on the reciprocating carriage and this slide bears against and during the reciprocations of the specimen carriage slides in contact with a feed device which is mounted on the stationary frame of the machine and backs up the slide in such a way as to prevent movement thereof and of the specimen holder carried thereby away from the cutting plane. The feed device is moved by the feed mechanism to advance the specimen holder toward the knife. In this way the specimen holder is positively held from movement away from the cutting plane even though there may be some unavoidable play or movement of the reciprocating carriage in this direction on its guides or bearings. While in the microtome shown and described the specimen holder is the reciprocating part, the invention is not restricted to this arrangement as the knife could be mounted on the reciprocating carriage and fed to the specimen holder in the same manner.

The feed mechanism comprises a ratchet and pawl and a pawl controller or lifter which permits the pawl to engage and turn the ratchet wheel on its forward stroke but lifts and holds the pawl off of the ratchet wheel so as to prevent it from dragging over the ratchet teeth during its return movement, and when the feed device has been advanced to the limit of its movement a safety device shifts the pawl lifter to a position in which it holds the pawl out of engagement with the ratchet wheel on its forward stroke, thus rendering the feed mechanism inoperative and preventing injury thereto. A feed regulator or shield is also provided which determines the movement of the ratchet wheel by the pawl and which can be adjusted to increase or decrease the advance movements of the specimen holder and thus regulate, as desired, the thickness of the sections being cut.

Figure 2:
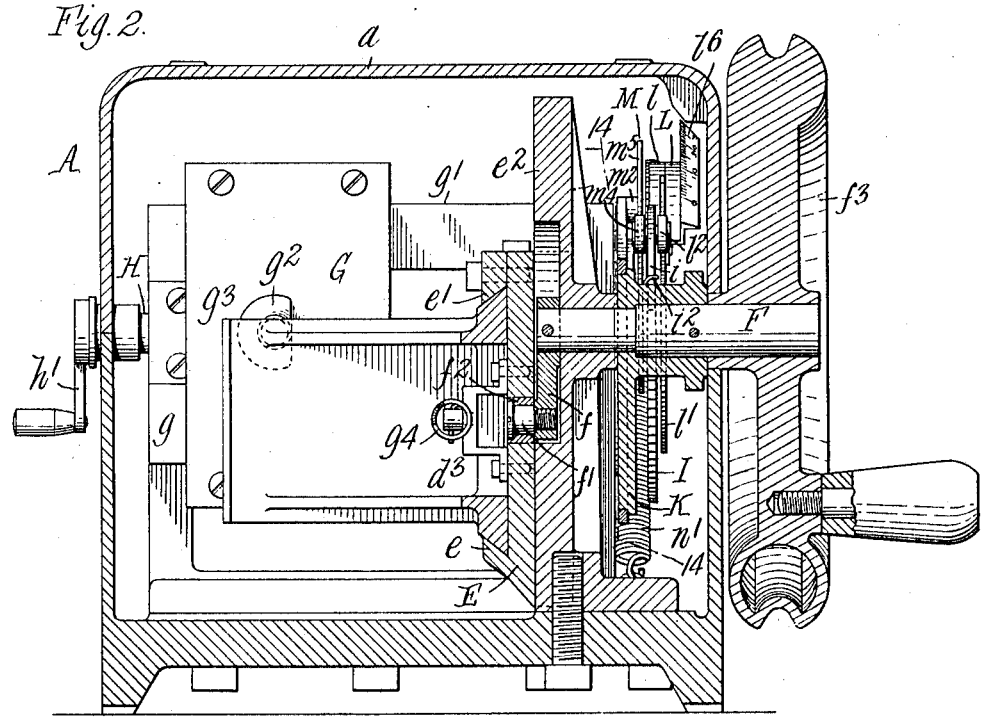
Figure 3:
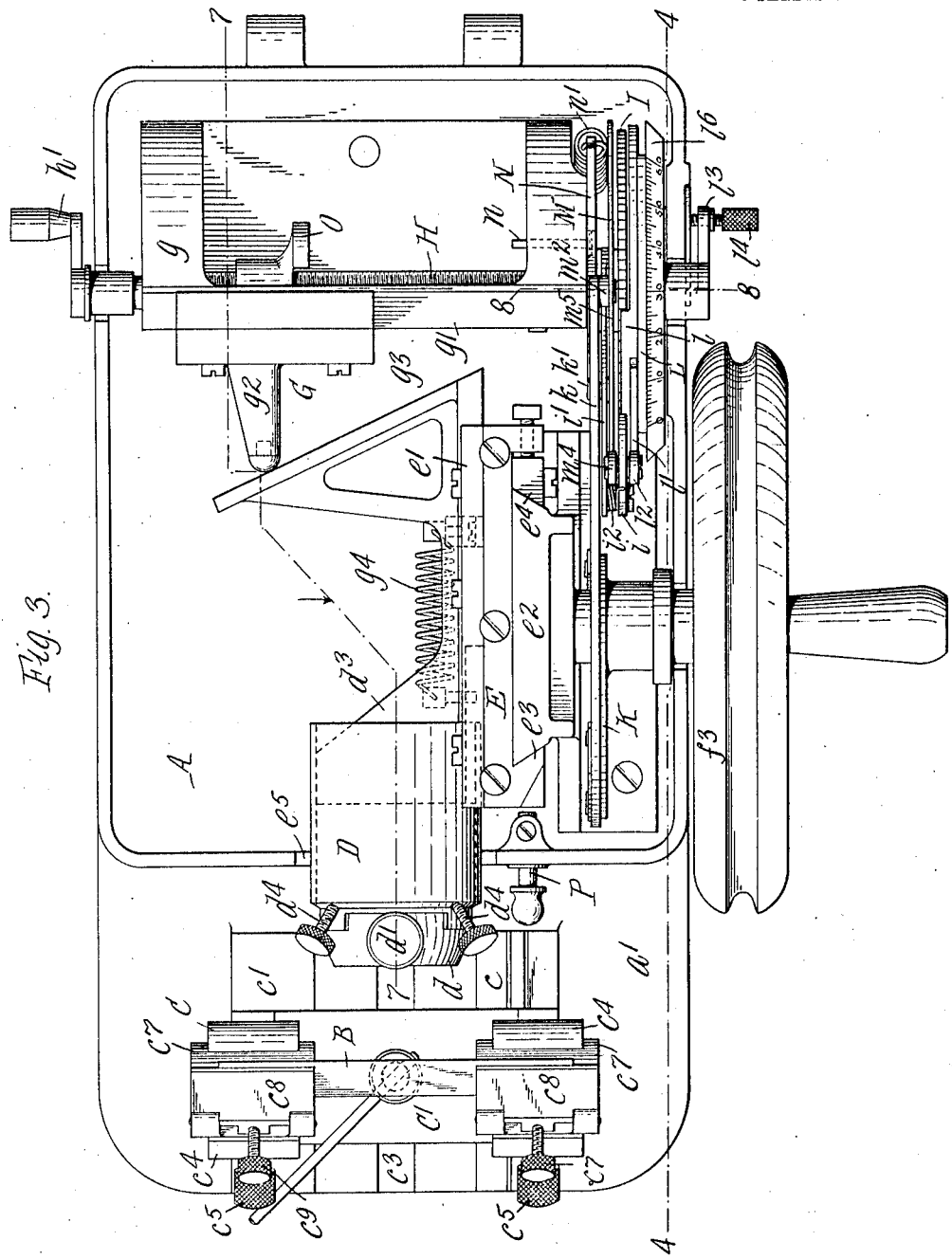

In the accompanying drawings, consisting of six sheets: Figure 1 is a side elevation of a microtome embodying the invention. Fig. 2 is a transverse sectional elevation thereof on an enlarged scale, in line 2—2, Fig. 1. Fig. 3 is a plan view thereof with the cover of the inclosing casing removed. Fig. 4 is a longitudinal sectional elevation thereof in line 4—4, Fig. 3. Fig. 5 is a sectional elevation of the latch for locking the machine from operation, showing the same in released position. Fig. 6 is a similar view showing the latch in the locking position. Fig. 7 is a fragmentary sectional elevation of the microtome in line 7—7, Fig. 3. Fig. 8 is a sectional elevation of the ratchet and pawl feed mechanism in line 8—8, Fig. 3. Fig. 9 is an elevation, partly in section in line 9—9, Fig. 8, and partly broken away, thereof. Fig. 10 is a similar view showing a different adjustment of the feed regulator or shield. Fig. 11 is a section thereof in line 11—11, Fig. 9. Fig. 12 is an enlarged sectional view of the safety device in line 12—12, Fig. 14. Fig. 13 is a similar view showing the safety device in the released position. Fig. 14 is an inside elevation, partly in section in line 14—14, Fig. 2, of the feed mechanism. Fig. 15 is a similar view showing the position of the parts when the pawl is at the limit of its forward stroke. Fig. 16 is a similar view showing the position of the parts during the return stroke of the pawl. Fig. 17 is a fragmentary outside elevation thereof. Fig. 18 is a fragmentary inside elevation thereof showing the inoperative position of the parts produced by the actuation of the safety device. Fig. 19 is a fragmentary front elevation of the micrometer showing the specimen and knife holders. Fig. 20 is a section of the specimen holder. Fig. 21 is a sectional elevation of the screw clamp for the knife holder in line 21—21, Fig. 19. Fig. 22 is a section of the knife holder in line 22—22, Fig. 19. Fig. 23 is a plan view of the specimen holder showing an angular adjustment thereof.

Like reference characters refer to like parts in the several figures.

A represents the stationary main frame of the microtome. This frame may be of any suitable construction but it is preferably in the form of a casing which incloses and protects the moving parts of the machine, and which has a hinged cover portion $a$ adapted to be opened to afford access to the machine, and a platform $a'$ which projects forwardly from the lower front portion of the casing and supports the knife holder.

B represents the cutting knife or blade which is stationarily secured in an adjustable knife holder C, and D represents a holder for the specimen which is mounted on a reciprocating carriage E by which the specimen is moved past the knife to cut the sections therefrom.

The knife holder C may be of any suitable construction but it is preferably constructed as follows, see Figs. 1, 3, 4, 19, 21 and 22: $C'$ represents a knife carriage which is adjustable horizontally toward and from the specimen holder D on suitable guides $c\ c'$ on the platform $a'$, the carriage being provided with a screw clamp $c^2$ working in an undercut slot $c^3$ in the platform, or other suitable device, for securing the carriage $C'$ in adjusted positions. The knife carriage $C'$ is provided with alined segmental cylindrical seats or sockets $c^4$ in which knife clamps are seated and held by set screws $c^5$. The knife clamps are adapted to be slipped endwise into their seats in the carriage and are capable of a limited angular or rotary adjustment in the seats for setting the knife at the proper cutting angle. Each knife clamp comprises a substantially U-shaped block $c^6$ having at one side a stationary jaw $c^7$ adapted to bear against one side of the knife and at the opposite side a movable jaw $c^8$ which is pivoted to the U-shaped block and is adapted to bear at its free end against the knife near its cutting edge. A set screw $c^9$ working in a threaded hole in the inner end of the pivoted jaw is adapted to engage the knife near its back edge. By tightening this set screw $c^9$ the back edge of the knife is pressed firmly against the stationary jaw $c^7$ of the clamp and the free end of the pivoted jaw $c^8$ is pressed forcibly against the knife near its cutting edge. The two clamps grip the ends of the knife at the opposite sides of the path of movement of the specimen holder and hold the knife very securely but nevertheless enable it to be quickly adjusted or removed and replaced. The clamps with the knife held therein can be adjusted in the clamp seats $c^4$ on the carriage $C'$ and secured by the set screws $c^5$ with the knife at the required cutting angle.

The specimen holder D shown, see Figs. 3, 4, 19, 20 and 23, comprises a segmental spherical block $d$ having a cavity or chamber in which the specimen is held by a screw clamp $d'$ or other device and a carrier or slide $d^3$ having a segmental spherical seat $d^2$ in which the block $d$ is held by set screws $d^4$ working in threaded holes in the carrier and adapted to bear at their ends against a flange $d^5$ at the inner end of the holder block $d$. There are preferably three of the set screws $d^4$ and by properly adjusting these screws the specimen holder can be adjusted universally in its seat and rigidly secured in any desired position. The specimen holder is thus exceedingly simple and strong in construction and the adjustable block or member thereof can be quickly and easily set to hold the specimen at a required angle. In so far as the other features of the invention are concerned however, a specimen holder of any other suitable construction could be employed. The carrier $d^3$ of the specimen holder is mounted in any suitable manner to slide toward and from the cutting plane for feeding the specimen to the knife, on the reciprocating carriage E by which the specimen is reciprocated past the knife for cutting off the section. As shown, the carrier $d^3$ slides horizontally between guides $e$ and $e'$ on the carriage E, one of the guides, $e'$, being adjustable, as usual, for preventing play or looseness of the slide in the guide-way, and the carriage E reciprocates on a stationary upright post or support $e^2$ in the casing A, the carriage having guides $e^3$ $e^4$ engaging the opposite edges of the post $e^2$ and one of which is adjustable to prevent looseness of the carriage on the post. The carriage and the mechanisms for reciprocating it and feeding the specimen holder to the knife are inclosed in the casing A, but the carrier $d^3$ projects out of the casing through an opening $e^5$ in the front thereof.

The carriage E may be reciprocated by any suitable means. As shown, an operating shaft F is journaled in the upright post or support $e^2$ and is provided at its inner end with a crank $f$ connected by a wrist pin $f'$, Fig. 2, to a block $f^2$ which slides in a slot in the carriage E. The shaft F is provided at its outer end, outside of the casing A, with a hand wheel or crank $f^3$ for turning it. This hand wheel can, if desired, be fashioned to receive a drive belt for operating the microtome by power.

G, Figs. 2, 3 and 7, represents a feed device for moving the specimen holder toward the knife in its guides on the reciprocating carriage for feeding the specimen to the knife. This feed device is mounted on a rigid stationary bracket or part $g$ of the main frame or casing A and bears against the rear end of the specimen carrier $d^3$, which slides in contact therewith in the reciprocations of the carriage E. In the construction shown, the feed device G is mounted to slide on a suitable horizontal guide or track $g'$ on the bracket $g$ in a direction at right angles to the direction of feed of the specimen holder on the carriage E and has a round nosed projection $g^2$ which bears against an oblique rear end face $g^3$ of the carrier $d^3$, see Figs. 3 and 7. The oblique face of the carrier is pressed rearwardly against and held in contact with the projection of the feed device by a spring $g^4$ connected to the carrier and to the carriage E, or other suitable means. By moving the feed device G on its track toward the carriage E the projection $g^2$ thereof is caused to slide across the oblique face of the carrier $d^3$ and advance the specimen holder toward the knife. The feed device being held from rearward movement by the stationary bracket $g$ on which it is mounted backs up the specimen holder and positively prevents movement thereof rearwardly, or away from the knife even should such movement be permitted by reason of any looseness of the carriage E on its guide support. Looseness or play of the carriage on its support can therefore have no effect on the feeding of the specimen holder. This result would be secured by arranging the feed device on a stationary support so as to back up the specimen holder irrespective of the construction of the feed device and its operating mechanism, and this feature of the invention is therefore claimed broadly regardless of the construction of the specimen holder, the feed device and the actuating mechanism for the feed device.

The feed mechanism shown for advancing the feed device G on its track comprises a feed screw H which is suitably journaled in the bracket $g$ and works in a threaded hole $h$ in the feed device. The feed screw preferably extends through the casing A at one end and is provided with a crank or handle $h'$ for turning it by hand in order to move the specimen holder quickly toward and from the knife, but in the normal operation of the machine the feed screw is rotated intermittently to advance the specimen holder a step after each cut by a ratchet and pawl feed mechanism, which is preferably constructed as follows: I represents a ratchet wheel which is secured to the feed screw preferably adjacent to the end thereof opposite to the handle $h'$, and $i$ is a pawl for turning the ratchet wheel. The pawl is pivoted on a pawl carrier or lever $i'$, journaled on a smooth portion of the feed screw, and its free end is pressed toward the ratchet wheel by suitable means, such as a spring $i^2$ coiled about the pawl pivot. The pawl lever $i'$ is oscillated by an eccentric K secured to the operating shaft F and a pitman or connecting rod $k$ which has a strap surrounding the eccentric and is connected to the pawl carrier by a suitable pivot $k'$, see particularly Figs. 14–16.

L represents a feed regulator or shield consisting of a plate pivoted on the smooth end of the feed screw beside the ratchet wheel and having a segmental circular flange $l$ which partially surrounds the ratchet wheel between the same and the pawl, and a segmental circular edge $l'$ on which an antifriction roller or projecting part $l^2$ of the pawl is adapted to travel. A crank arm $l^3$ extends from the hub of the regulator outside of the adjacent wall of the casing A and is provided at its end with a set screw $l^4$, Fig. 11, which serves as a handle for turning the regulator or shield and is adapted to be screwed into engagement with the wall of the casing A to secure the regulator or shield in different positions. An arm $l^5$ preferably projects from the hub of the regulator or shield and is adapted to bear against the inner face of the wall of the casing opposite the set screw to prevent the regulator and the feed screw H from being sprung in tightening up the set screw and to insure a better hold for the regulator or shield. In the forward movement of the pawl the roller $l^2$ rolls on the edge $l'$ of the regulator. When the roller $l^2$ passes off of the edge $l'$ and the end of the pawl clears the end of the flange $l$, the pawl is swung into engagement with one of the teeth of the ratchet wheel by its spring $i^2$ and turns the ratchet wheel during the remainder of its forward stroke. The roller $l^2$ does not leave the edge $l'$ until the end of the pawl is near the end of the flange $l$, so that the sliding of the pawl on the flange $l$ and the wear thereon is reduced to the minimum. By adjusting the regulator or shield so that the pawl will clear the flange of the shield sooner or later in its forward stroke, the pawl will be caused to turn the ratchet wheel and the feed screw H a greater or less number of degrees, thereby regulating the feed of the specimen. When the pawl is moved to a position over the flange $l$ of the regulator, the feed screw H can be turned in either direction by the hand crank $h'$ for quickly adjusting the specimen holder relative to the knife.

With a feed mechanism actuated by an eccentric on the operating shaft, as shown, the eccentric can be arranged so that it moves the pawl to advance the specimen while the latter is above and out of contact with the knife, thereby preventing the specimen from being pressed against the side of the knife, which is a serious objection to microtomes in which the feed mechanism is mounted on the reciprocating carriage, especially when feeding for relatively thick sections.

The regulator or shield shown has a flange with a graduated scale $l^6$ which can be seen through an opening $l^7$, Fig. 1, in the adjacent wall of the casing A and coöperates with an index or mark on the casing to indicate the adjustment of the regulator.

M represents a pawl lifter which is pivoted at $m$ in any suitable manner and is provided with a curved slot $m'$ in which a stud or projection $m^2$ on the end of the pitman $k$ slides. The eccentric K turns in the direction indicated by the arrows, that is, from right to left in Figs. 14–16, and the location of the pivots connecting the pitman to the pawl lever and to the pawl lifter, the pivot for the pawl lifter and the slot $m'$ relative to each other and to the axis of the eccentric, and the shape of the slot $m'$ are such that when the pawl commences its return stroke the eccentric will swing the outer end of the pitman upwardly about the pivot $k'$ connecting it to the pawl lever, thereby lifting the free end of the pawl lifter, as shown in Fig. 16. During the return stroke of the pawl an antifriction roller or other suitable part $m^4$ thereon will travel on the curved edge $m^5$ of the pawl lifter, which is then raised with respect to the ratchet wheel, as explained, and the end of the pawl will be lifted and held out of engagement with the teeth of the ratchet wheel, so that the pawl will not drag rearwardly over the ratchet teeth. When the pawl commences its forward stroke the eccentric will swing the outer end of the pitman downwardly about the pivot $k'$ connecting it to the pawl lever and thus lower the outer end of the pawl lifter to a position in which the pawl roller $m^4$ will not engage the curved edge $m^5$ of the pawl lifter, so that when the pawl clears the end of the flange $l$ of the regulator or shield its end can drop into engagement with the ratchet wheel and turn the wheel and the feed screw to which it is connected, as before explained. Thus the pawl lifter does not interfere with the engagement of the pawl with the ratchet wheel in the forward stroke of the pawl but holds the pawl clear of the ratchet wheel and prevents it from dragging over the ratchet teeth during its return stroke. The pawl therefore has no tendency to turn the ratchet wheel rearwardly in its return stroke and the noise and wear incident to the dragging of the pawl over the teeth is avoided. The pawl lifter is preferably fulcrumed by its pivot $m$ on a shifting support preferably consisting of a lever N which is fulcrumed on the smooth end of the feed screw H and is normally held in the position shown in Figs. 14 and 15 by a releasable safety latch or holding device $n$ against the action of the spring $n'$ connected to the lever and to the bracket $g$ or other suitable part of the stationary frame. The safety latch $n$ shown consists of a spring actuated plunger which is movable endwise in a chamber or barrel $n^2$ in the bracket or support $g$ and has a grooved head entering a key-hole slot $n^3$ in the shifting lever N, see Figs. 12–15 and 18. In the normal position of the parts shown in Figs. 14 and 15 the enlarged end of the latch engages in the large end of the slot $n^3$ in the shifting lever.

O represents a safety trip device or projection on the feed device G. When the feed device nears the limit of its advance or feeding movement the trip device O engages the safety latch $n$, moving its enlarged end out of the large end of the slot $n^3$ in the shifting lever N and bringing the grooved part of the latch in line with the narrow portion of the slot $n^3$. The shifting lever is then moved by its spring $n'$ from the position shown in Figs. 14 and 15 to the position shown in Fig. 18, which raises the pivot $m$ for the pawl lifter M, thus shifting the pawl lifter M to the position shown in Fig. 18 in which its curved edge $m^5$ will hold the pawl out of operative engagement with the ratchet wheel in its forward stroke as well as in its return stroke, thereby preventing the ratchet wheel and feed screw from being operated by the pawl. The safety device therefore acts automatically to prevent the operation of the feed mechanism when the feed device has been moved to its limit and prevents injury to the machine in the event of an attempt to operate it. The pawl lifter M is returned to its normal position in which it permits the operation of the feed mechanism by lifting the free end of the shifting lever N. When the lever is lifted to the normal position the large end of the safety latch $n$ springs into the large end of the slot $n^3$ and holds the shifting lever.

The described means for preventing the pawl from dragging over the ratchet teeth and the safety device are not dependent for their action upon the feed regulator L and could be used without the regulator or with one of different construction.

P, Figs. 4-6, represents a latch or device for locking the microtome from operation. The latch shown consists of a push pin slidably mounted in a hole $p$ in the front wall of the casing and adapted to be pushed inwardly into a hole $p'$ in the reciprocating carriage E and hold it from movement. The push pin is releasably retained in the holding and released positions by a spring pin $p^2$ adapted to engage in either of two grooves in the push pin. Any other suitable device can be employed for locking the machine.

I claim as my invention:

1. The combination with a knife, and a specimen holder, one of which parts reciprocates for cutting the specimen, of feed mechanism for advancing the reciprocating part relative to the cutting plane, comprising a feed device which is mounted on a stationary support and normally holds the reciprocating part from movement away from the cutting plane, and actuating means for said feed device, substantially as set forth.

2. The combination with a knife, a specimen holder, and a carriage on which one of said parts is mounted and which reciprocates for cutting the specimen, said part being movable on said carriage toward and from said other part, of feed mechanism for advancing said reciprocating part toward the cutting plane, comprising a feed device which is mounted on a stationary support and normally holds the reciprocating part from movement away from the cutting plane, and actuating means for said feed device, substantially as set forth.

3. The combination with a knife, a specimen holder, and means for reciprocating the specimen holder for cutting the specimen, of feed mechanism for advancing the specimen holder toward the knife, comprising a feed device which is mounted on a stationary support and normally holds the specimen holder from movement away from the knife, and actuating means for said feed device, substantially as set forth.

4. The combination with a knife, a specimen holder and a reciprocating carriage on which the specimen holder is mounted, the specimen holder being movable on the carriage toward and away from the knife, of feed mechanism for advancing the specimen holder toward the knife, comprising a feed device which is mounted independently of said carriage and which bears against the specimen holder and normally holds it from movement away from the knife, and actuating means for said feed device, substantially as set forth.

5. The combination with a knife, a specimen holder and a reciprocating carriage on which the specimen holder is mounted, the specimen holder being movable on the carriage toward and away from the knife, of feed mechanism for advancing the specimen holder toward the knife, comprising a feed device against which the specimen holder bears and slides in the reciprocations of the carriage, and means for actuating said feed device to advance the specimen holder, substantially as set forth.

6. The combination with a knife, a reciprocating carriage, and a specimen holder which reciprocates with the carriage and is mounted to slide thereon toward the knife and has an oblique face, of feed mechanism for advancing the specimen holder toward the knife comprising a feed device which is moved in a direction at an angle to the direction of feed of the specimen holder and bears against said oblique face, and means for holding said oblique face against said feed device, substantially as set forth.

7. The combination with a knife, a reciprocating carriage, and a specimen holder which reciprocates with the carriage and is mounted to slide thereon toward the knife and has an oblique face, of a feed device which slides on a stationary support in a direction at an angle to the direction of feed of the specimen holder and bears against said oblique face, means for holding said oblique face against said feed device, and an intermittently operated feed screw for moving said feed device, substantially as set forth.

8. The combination with a knife and a specimen holder, one of which reciprocates, of an operating shaft for said reciprocating part, feed mechanism for feeding one of said parts toward the other comprising a ratchet wheel, an oscillating pawl for intermittently rotating said ratchet wheel, a movable pawl lifter, and mechanism actuated by said shaft independently of said reciprocating part for oscillating said pawl and actuating said pawl lifter to permit the pawl to engage the ratchet teeth during its forward stroke and to hold it out of contact with the ratchet teeth during its return stroke, substantially as set forth.

9. The combination with a knife and a specimen holder, one of which reciprocates, of feed mechanism for feeding one of said parts toward the other comprising a ratchet wheel, a pawl, means for oscillating said pawl to intermittently rotate said ratchet wheel, a movable pawl lifter, and means independent of said reciprocating part, which moves said pawl lifter to a position in which the pawl rides on the pawl lifter and is thereby held out of contact with the ratchet teeth during its return stroke and moves said pawl lifter to a position in which it leaves the pawl free to engage the ratchet teeth during the forward stroke of the pawl, substantially as set forth.

10. The combination with a knife and a specimen holder, one of which reciprocates, of feed mechanism for feeding one of said parts toward the other comprising a ratchet wheel, a pawl therefor, a pawl carrier, an eccentric, a pitman connecting said eccentric to said pawl carrier, and a pawl lifter which is connected to said connecting rod and is moved thereby to permit the pawl to engage the ratchet teeth during its forward stroke and to hold the pawl off of the ratchet teeth during its return stroke, substantially as set forth.

11. The combination with a knife and a specimen holder, one of which reciprocates, of feed mechanism for feeding one of said parts toward the other comprising a ratchet wheel, a pawl therefor, a pawl carrier, an eccentric, a pitman operated by said eccentric and pivoted to said pawl carrier, and a pivoted pawl lifter which has a sliding connection with said pitman whereby the pawl lifter is actuated to permit the pawl to engage the ratchet teeth during its forward stroke and to hold the pawl off of the ratchet teeth during its return stroke, substantially as set forth.

12. The combination with a knife and a specimen holder, one of which reciprocates, of feed mechanism for feeding one of the said parts toward the other comprising a ratchet wheel, a pawl, means for oscillating said pawl to intermittently rotate said ratchet wheel, an adjustable shield which coöperates with the pawl to vary the movement of the ratchet wheel by the pawl, a movable pawl lifter, and mechanism independent of said reciprocating part for actuating said pawl lifter to permit the pawl to engage the ratchet teeth during its forward stroke and to hold it out of contact with the ratchet teeth during its return stroke, substantially as set forth.

13. The combination with a knife and a specimen holder, one of which reciprocates, of feed mechanism for feeding one of said parts toward the other comprising a ratchet wheel, an oscillating pawl for intermittently rotating said ratchet wheel, a pawl lifter, mechanism for actuating said pawl lifter to permit the pawl to engage the ratchet teeth during its forward stroke and to hold it off of the ratchet teeth during its return stroke, and safety means which act automatically when the part actuated by the ratchet wheel reaches a predetermined position to shift said pawl lifter to a position in which it holds the pawl out of engagement with the ratchet wheel during its forward stroke, substantially as set forth.

14. The combination with a knife and a specimen holder, one of which reciprocates, of feed mechanism for feeding one of said parts toward the other comprising a ratchet wheel, an oscillating pawl for intermittently rotating said ratchet wheel, a pawl lifter, and safety means which act automatically when the part actuated by the ratchet wheel reaches a predetermined position to shift said pawl lifter to a position in which it holds the pawl out of engagement with the ratchet wheel and prevents the operation of the feed mechanism, substantially as set forth.

15. The combination with a knife and a specimen holder, one of which reciprocates, of feed mechanism for feeding one of said parts toward the other comprising a feed device, and means for moving the same, a safety device which is actuated by said feed device when it reaches a predetermined position, and means which act to throw said feed mechanism out of operation when said safety device is actuated, substantially as set forth.

16. The combination with a knife and a specimen holder, one of which reciprocates, of feed mechanism for feeding one of said parts toward the other comprising a ratchet wheel, an oscillating pawl for intermittently rotating said ratchet wheel, a pawl lifter, mechanism for actuating said pawl lifter to permit the pawl to engage the ratchet teeth during its forward stroke and to hold it off of the ratchet teeth during its return stroke, a movable support for said pawl lifter, a safety device which normally holds said support stationary, and means which operate said safety device to release said support when the part actuated by the ratchet wheel reaches a predetermined position, whereby the pawl lifter is shifted to a position in which it holds the pawl out of engagement with the ratchet wheel during its forward stroke, substantially as set forth.

17. In a microtome, a knife holder comprising a clamp having a stationary jaw which bears against one side of the knife, an opposing jaw which is pivoted between its ends and one end of which is adapted to bear against the opposite side of the knife near its cutting edge, and a set screw which works in a threaded hole in the other end of said pivoted jaw and is adapted to bear against the knife near its back, substantially as set forth.

18. In a microtome, a knife holder comprising a clamp having stationary and movable jaws between which the knife is gripped, and means for forcing the movable jaw against the knife, a support having a seat in which said clamp is angularly adjustable, and means for securing the clamp in said seat, substantially as set forth.

19. In a microtome, a specimen holder comprising a block having a spherical surface and provided with means for holding the specimen, a carrier having a seat in which said block rests and is universally movable, and set screws on said carrier engaging a part of said block for adjustably securing the block in said seat, substantially as set forth.

20. In a microtome, a specimen holder comprising a block having a segmental spherical surface and a flange at its inner end and provided with means for holding the specimen, a carrier having a segmental spherical seat in which said block rests and is universally movable, and set screws on said carrier and engaging said flange of the block for adjustably securing the block in said seat, substantially as set forth.

21. In a microtome, the combination of a casing, a knife holder mounted exteriorly on the casing, a reciprocating carriage inclosed in the casing, a specimen holder mounted on said carriage and projecting out through a hole in the casing, and drive means for said carriage, and feed mechanism for feeding the specimen holder toward the knife holder, also inclosed in the casing, said casing having a cover portion which is movable to expose the inclosed parts, substantially as set forth.

22. The combination with a knife, a specimen holder, and a carriage by which one of said parts is reciprocated parallel with the cutting plane for cutting the specimen, of feed mechanism mounted independently of said carriage for advancing the reciprocating part toward the cutting plane, and an operating shaft for reciprocating said carriage, said shaft being operatively connected, independently of the carriage, to said feed mechanism, substantially as set forth.

23. The combination with a knife, a specimen holder and a carriage by which one of said parts is reciprocated for cutting the specimen, of feed mechanism mounted independently of said carriage for advancing the reciprocating part toward the cutting plane, a rotary shaft connected to said carriage for reciprocating it, and an eccentric on said shaft for actuating said feed mechanism, substantially as set forth.

Witness my hand, this 12th day of September, 1910.

HARVEY N. OTT.

Witnesses:
Louis M. Potter,
Letitia Graveson.

---

Copies of this patent may be obtained for five cents each, by addressing the "Commissioner of Patents, Washington, D. C."